United States Patent
Baidya et al.

(10) Patent No.: US 11,756,238 B2
(45) Date of Patent: Sep. 12, 2023

(54) NODE LIGHTING

(71) Applicant: Adobe Inc., San Jose, CA (US)

(72) Inventors: Rakesh Baidya, Delhi (IN); Praveen Kumar Dhanuka, West Bengal (IN); Nitin Sharma, Haryana (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 55 days.

(21) Appl. No.: 17/173,959

(22) Filed: Feb. 11, 2021

(65) Prior Publication Data

US 2022/0262045 A1 Aug. 18, 2022

(51) Int. Cl.
*G06T 11/00* (2006.01)
*G06F 3/04845* (2022.01)

(52) U.S. Cl.
CPC ........ *G06T 11/001* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2006/0037019 | A1* | 2/2006 | Austin | G06F 8/10 718/100 |
| 2011/0242109 | A1* | 10/2011 | Huang | G06T 11/203 345/442 |
| 2011/0295398 | A1* | 12/2011 | Chen | G06F 17/00 700/97 |
| 2013/0182956 | A1* | 7/2013 | Wang | G06V 30/2268 382/185 |
| 2017/0228898 | A1* | 8/2017 | Liu | G06T 11/60 |

OTHER PUBLICATIONS

Jansen, "Finding the shortest route to your holiday destination: Dijkstra's algorithm"; posted Aug. 15, 2017, https://www.networkpages.nl/finding-the-shortest-route-to-your-holiday-destination-dijkstras-algorithm/ (Year: 2017).*

* cited by examiner

*Primary Examiner* — Sarah Le
(74) *Attorney, Agent, or Firm* — NICHOLSON DE VOS WEBSTER & ELLIOT LLP

(57) ABSTRACT

Embodiments are disclosed for adding node highlighting to vector graphics. In particular, in one or more embodiments, the disclosed systems and methods comprise receiving a selection of a plurality of anchor points of a vector graphic to be highlighted, generating a graph representing one or more path objects of the vector graphic, each node of the graph corresponding to an anchor point of the one or more path objects and each connection corresponding to a path segment connecting the anchor point to another anchor point, identifying a highlight trajectory including a subset of nodes from the graph, the highlight trajectory including at least a start node and an end node, generating a highlight path including at least one or more highlight nodes corresponding to a subset of nodes from the highlight trajectory, and updating the vector graphic to include the highlight path.

20 Claims, 14 Drawing Sheets

NODE LIGHTING

BACKGROUND

Technical Field

The present disclosure relates generally to systems and method for editing vector graphics images. More specifically, one or more embodiments of the present disclosure relate to systems and methods that enable highlighting to be added to a vector graphics image based on user input.

Background and Relevant Art

Conventional computer graphic systems enable users to create various types of computer graphics content such as free form illustration, engineering design, or other types of technical or non-technical computer graphics. The computer graphics content created by the designer often includes complex underlying geometry. The most common representation for such geometry uses multiple cubic Bezier splines, each of which is commonly known as a path object. Typically, each path object includes multiple connected cubic Bezier segments.

Highlights typically comprise the brightest area in an image and are used to make the image more dynamic. Highlights add the appearance of sharp light falling along the edges of an object, adding a feeling of dimension to the image. Highlights also give the glimpse of the material of the surface where it falls. Typically, for a designer to add highlights to a vector graphic image, the designer must manually create new vector objects that represent the highlighted region and add them to the image. This is a tedious task that requires the designer to manually identify the boundaries of a given highlight and the relative location of the boundaries of the highlight to the boundaries of the vector object being highlighted. This is a tedious and difficult task to perform accurately.

These and other problems exist with regard to adding highlights to vector geometry in digital visual media.

BRIEF SUMMARY

Introduced here are techniques/technologies that enable highlighting to be added automatically to vector graphics. In particular, in one or more embodiments, the disclosed systems and methods comprise receiving a selection of anchor points in a given vector graphic to be highlighted. A given vector graphic is often comprised of multiple path objects (also referred to herein as paths) and the user's selected anchor points are associated with at least one path object in the vector graphic. The path objects in the vector graphic are preprocessed to remove any redundant anchor points (e.g., one anchor point from a pair of overlapping anchor points) and also to split any segments which are overlapped by an anchor point. Using the resulting list of anchor points and segments produced during preprocessing, a graph representation of the vector graphic is generated.

In some embodiments, the content design system then detects the nodes of the graph that will be highlighted. These nodes include anchor points that have been explicitly selected by the user. For example, the user selects a start node and end node to highlight and optionally one or more intermediate nodes. Additionally, in some embodiments, these nodes include anchor points not selected by the user, but which lie along a trajectory that was traveled by the user's cursor while selecting anchor points. Once the highlight nodes have been detected, then a highlight path object is created based on highlight parameters provided by the user. For example, the user specifies a spread value which indicates a width of the highlight path and/or an offset value which indicates a distance from the highlight nodes for the highlight path to be offset.

Additional features and advantages of exemplary embodiments of the present disclosure are set forth in the description which follows, and in part are obvious from the description, or are learnable by the practice of such exemplary embodiments.

BRIEF DESCRIPTION OF THE DRAWINGS

The detailed description is described with reference to the accompanying drawings in which.

DETAILED DESCRIPTION

Figure 1:
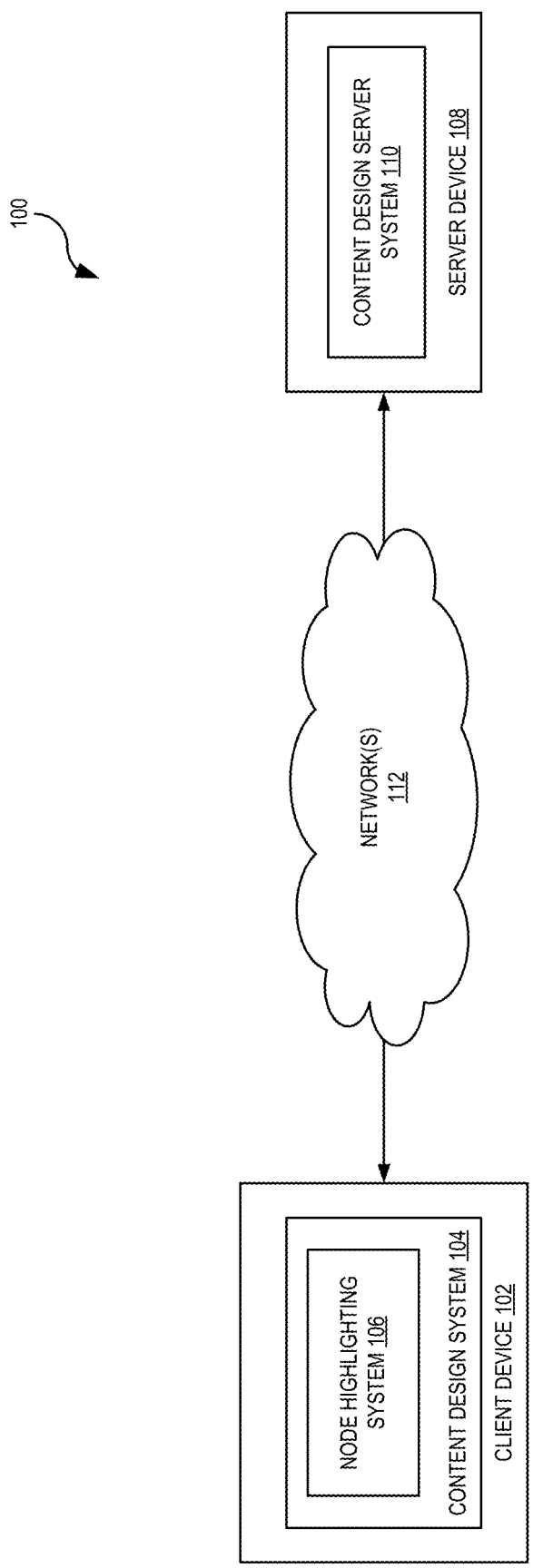
FIG. 1 illustrates a schematic diagram of an exemplary environment in which a content design system is implemented in accordance with one or more embodiments.

One or more embodiments of the present disclosure include a content design system that enables users to interactively add highlighting to surfaces in vector-based graphics. Highlights add the appearance of light being incident on edges of an object. This adds depth and dynamism to otherwise flat images. Typically, to make these edits, a designer must manually add new path objects to the vector graphic to add highlights. Such manual edits are both tedious and error prone.

Embodiments enable highlighting to be added automatically in a given vector-based graphic. Initially, the user selects a vector graphic to which the user wants to add highlighting. For example, the user loads an existing vector graphic (e.g., from a locally stored file, via a storage service, etc.) or creates a new vector graphic in a canvas/workspace of the content design system. The content design system then detects the vector graphic objects present in the vector graphic. For example, a given vector graphic is often comprised of multiple vector graphic objects (also referred to herein as path objects, or paths). In some embodiments, the content design system makes a vector graphic object list that includes all of the vector graphic objects in the vector graphic. Alternatively, the vector graphic object list includes only those vector graphic objects which are likely to be highlighted based on the user's input.

In some embodiments, the content design system then detects the nodes of the vector graphic objects that will be highlighted. For example, the user selects a start node and end node to highlight. In some embodiments, the user additionally selects one or more intermediate nodes. The nodes are anchor points of the vector graphic objects in the vector graphic. In some embodiments, the user selects the start, end, and any intermediary nodes via a graphical user interface and one or more user input devices. For example, in some embodiments, the user selects a node with a pointing device (e.g., mouse, trackpad, touchscreen, etc.) while simultaneously selecting a modifier key on a keyboard or other input device.

Once the highlight nodes have been detected, then a highlight path object is created based on highlight parameters provided by the user. For example, the user specifies a spread value which indicates a width of the highlight and/or an offset value which indicates a distance from the highlight nodes for the highlight path to be offset. The resulting highlight path object is represented in terms of Bezier geometry which enables vector properties such as pattern, spot color, gradient etc., to be applied on the highlight path object.

Term Definitions

As used herein, the term "control points" refers to one or more points that define the shape of a Bezier segment. For example, a quadratic Bezier segment includes three control points while a cubic Bezier segment includes four control points.

As used herein, the term "anchor points" refer to a set of points that define the beginning and ends of segments. Anchor points are also added to subdivide an existing segment into subsegments for editing. Anchor points are selected and moved to change the direction and/or curvature of a segment.

As used herein, the term "node" refers to the anchor point selected by the user to be highlighted. In some embodiments, the user creates or selects anchor points to highlight. These anchor points are either on or very close to the existing path geometry. Every anchor is denoted by $p_0$, $c_{in}$, $c_{out}$ where $c_{in}$ and $c_{out}$ are tangent direction of bezier path incident on the anchor point Po.

As used herein, the term "highlight" or "highlight path" refers to an illuminated path or area around the selected nodes.

As used herein, the term "spread" refers to the width of the highlight area around the selected nodes. This gives the appearance of the intensity or angle of the light causing the highlight.

As used herein, the term "offset" refers to a distance from the surface or path of selected nodes where the highlight is added. For example, a zero-offset highlight occurs at the surface or path of selected nodes, while an offset highlight occurs at an offset distance from the surface or path of selected nodes.

Referring now to the figures, FIG. 1 illustrates a schematic diagram of an exemplary environment 100 within which a node highlighting system 106 (or simply "highlighting system" 106) operates. In one or more embodiments, the exemplary environment 100 includes a client device 102, a server device 108, and one or more networks 112. The network(s) 112 include any suitable network over which the computing devices communicate. Example and features of computing devices (e.g., the client device 102 and the server device 108) and networks (e.g., network(s) 112) are discussed in more detail below with regard to FIGS. 13-14.

As illustrated in FIG. 1, the environment 100 includes the client device 102 having a content design system 104 as well as the highlighting system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application, and/or system operations on the client device 102.

As shown in FIG. 1, the content design system 104 includes the highlighting system 106. In some embodiments, however, the highlighting system 106 is located on the client device apart from the content design system 104. As mentioned above, and as is explained in detail below, the highlighting system 106 enables users to select nodes (e.g., anchor points) of a vector graphic to be highlighted, provide highlight parameters, and generate a highlight for the vector graphic. Unlike traditional systems, which require highlights to be created manually, embodiments of the highlighting system automatically create the highlights for the selected nodes based on the highlight parameters. Additional detail regarding the highlighting system 106 is provided below with respect to subsequent figures.

In addition, the environment 100 includes the server device 108. The server device 108 generates, stores, receives, and/or transmits any type of data, including graphical content and/or cubic Bezier splines. As shown, the server device 108 includes a content design server system 110 that communicates with the content design system 104 on the client device 102. For example, the content design server system 110 transmits graphical content to the client device 102, which enables the client device 102 to edit the vector graphic. Notably, while only a single server device is shown, the content design server system 110 is implemented across multiple server devices.

While not illustrated, in one or more embodiments, the server device 108 includes all, or a portion of, the highlighting system 106, such as within the content design server system 110. For example, when located in the server device 108, the highlighting system 106 comprises an application running on the server device 108 or a portion of a software application that is downloaded to the client device 102. For instance, the highlighting system 106 includes a web hosting application that allows the client device 102 to interact with content from the content design server system 110 hosted at the server device 108. In this manner, the server device 108 adds node highlighting in vector-based content based on inputs received from a designer using client device 102.

Figure 2:
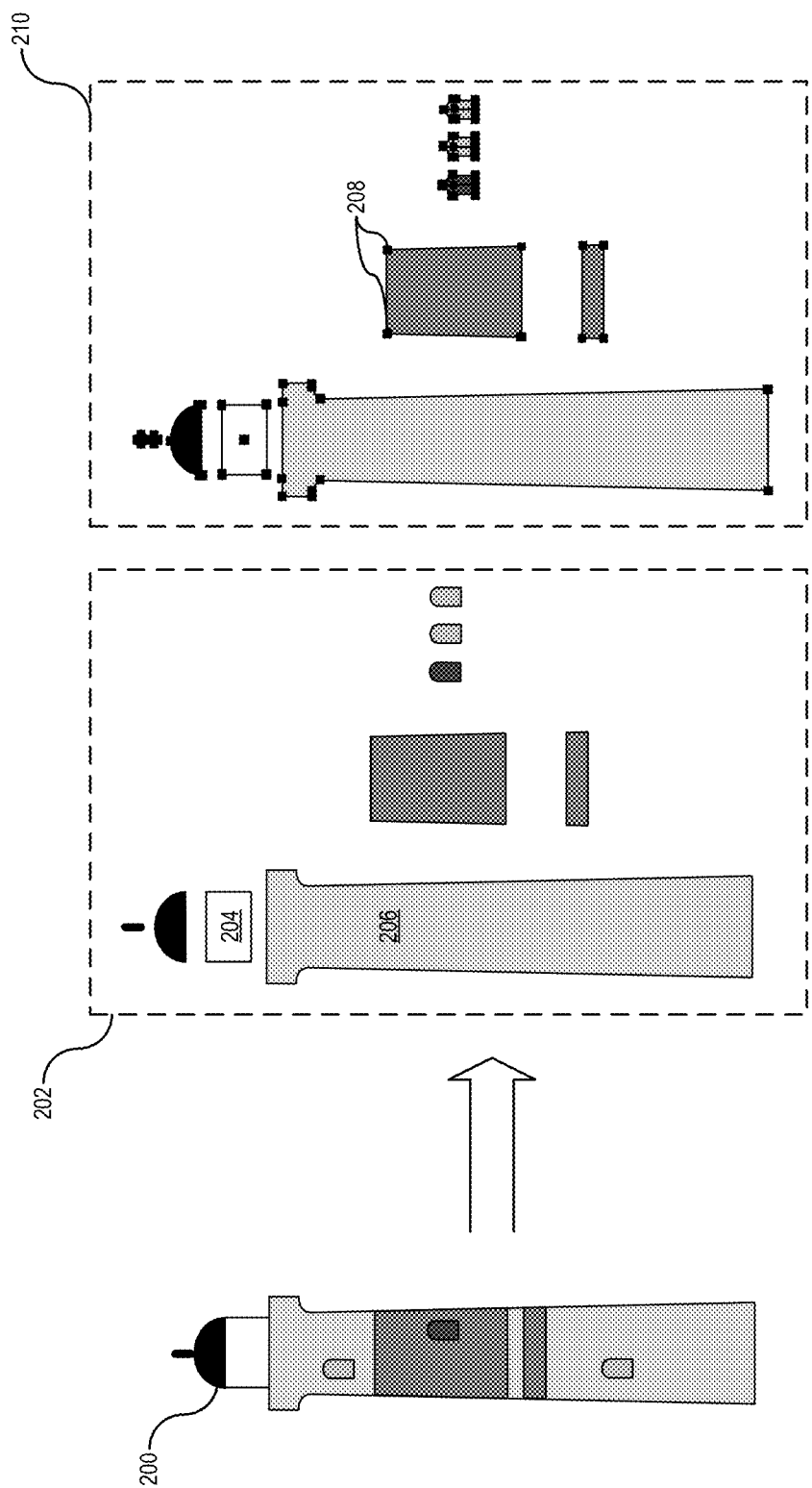
FIG. 2 illustrates a diagram of a vector-based design comprising a plurality of vector objects.

FIG. 2 illustrates a diagram of a vector-based design comprising a plurality of vector objects. As discussed, a content design system enables a designer to create complex shapes using multiple path objects. For example, as shown in FIG. 2, a designer creates a vector graphic 200 in a content design system. Though a tower is shown in FIG. 2, the content design system enables the designer to create arbitrary object(s) (e.g., shape, curve, etc.) of greater or lesser complexity. As shown at 202, vector graphic 200 comprises a plurality of path objects, such as path objects 204 and 206 (and every other path shown in box 202). Each path object comprises a plurality of segments, where each segment is a Bezier curve or a line. Each segment is defined by a plurality of control points. In vector-based graphics, and as used herein, "control points" refer to a set of points that influence and define the shape of a Bezier spline. For example, a quadratic Bezier spline includes three control points while a cubic Bezier spline includes four control points. Additionally, the end of each segment includes an anchor point, such as anchor points 208, which are depicted in this example as squares overlapping the ends of segments, as shown in box 210. As used herein, "anchor points" refer to a set of points that define the beginning and ends of segments. Anchor points are also used to subdivide a segment into subsegments for editing. The anchor points are selected and moved to change the direction and/or curvature of the segment. In some embodiments, control points are connected to anchor points via handles.

Figure 3:
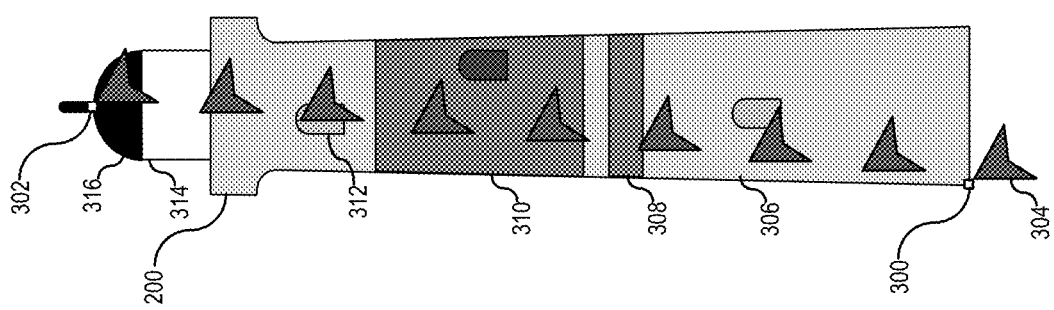
FIG. 3 illustrates an example of a cursor trajectory when identifying an area to highlight in accordance with one or more embodiments.

FIG. 3 illustrates an example of a cursor trajectory when identifying an area to highlight in accordance with one or more embodiments. As shown in FIG. 3, a user selects a start node 300 and an end node 302 on vector graphic 200. In some embodiments, the user designates the start and end nodes during selection. For example, modifier keys, in concert with a mouse or other input device, enable the user to designate the start and end nodes. For instance, in some embodiments, the user holds down the 's' key and clicks on a first node to designate that first node as start node 300. The user then holds down the 'e' key and clicks on a second node to designate that second node as end node 302. The highlight path is then to be generated to cover the path objects between start node 300 and end node 302. Although not depicted, in some embodiments, the user is enabled to select additional, intermediate, nodes between the start node and the end node. For example, the user holds down the 'i' key and clicks on any number of nodes between the start node and the end node to designate these nodes as intermediate nodes.

While marking these nodes, the user typically traverses along a line between the start node and the end node that corresponds to the line along which the user intends to create the highlight path. While the user is marking nodes, the content design system tracks the cursor's 304 movements and detects any path objects over which the cursor traverses. For example, in the tower example of FIG. 3, there are multiple path objects (e.g., 306-316) over which the cursor travels while marking start node 300 and end node 302 for highlighting. Each path object is recorded and added to an object list. Once the user has completed marking nodes, the object list includes a complete list of the path objects (also referred to herein as "subject list") which are likely to include highlighting, based on the user's cursor inputs.

Figure 4:
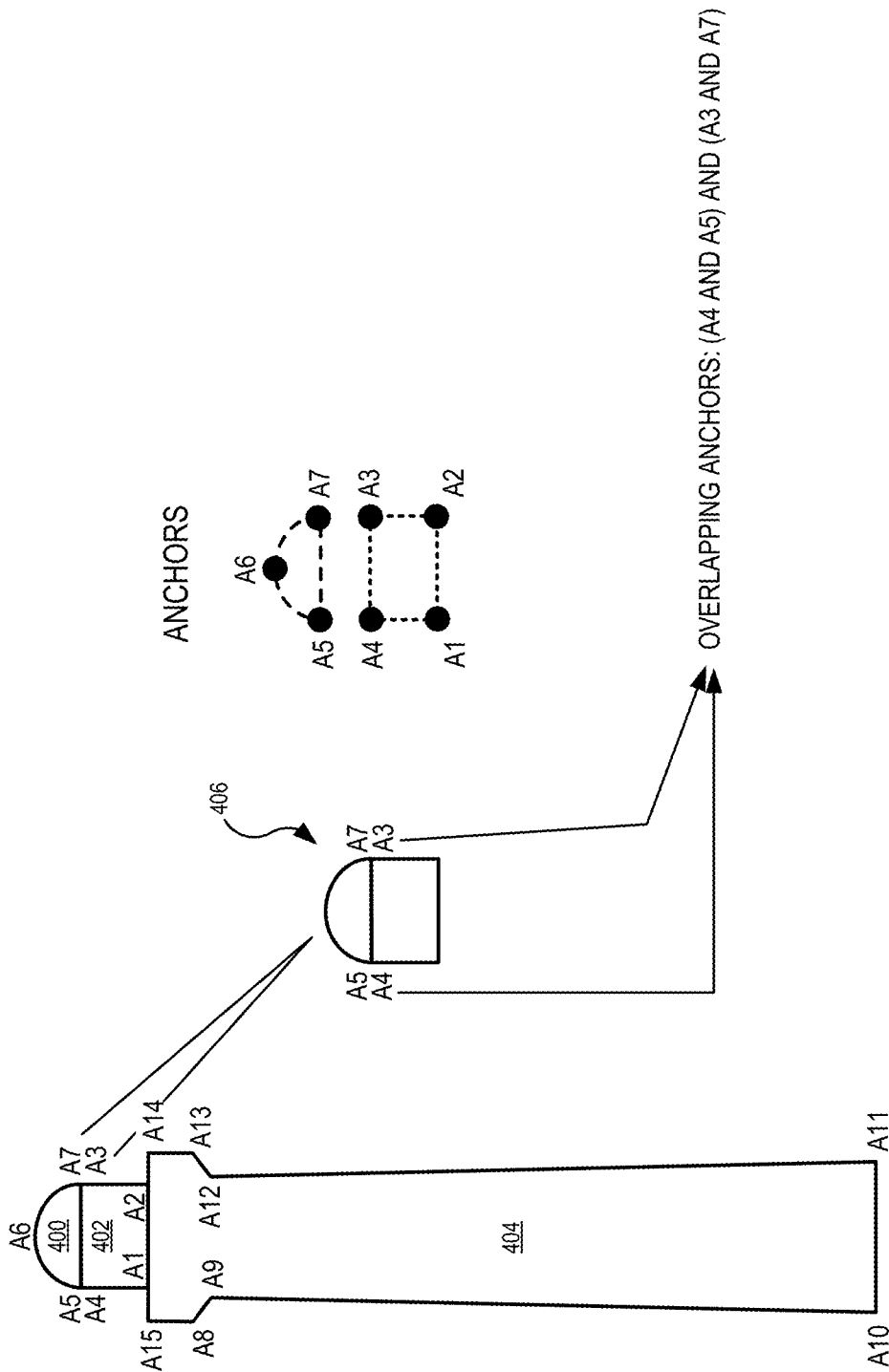
FIG. 4 illustrates an example of overlapping geometry, in accordance with an embodiment.

FIG. 4 illustrates an example of overlapping geometry, in accordance with an embodiment. A graph, G, is generated for the path objects in the list of path objects. The graph G includes each anchor point in the path objects as a graph node and each segment connecting two anchor points as a path connecting two corresponding nodes in the graph G. An anchor point is connected to at most two other anchor points. Accordingly, a graph of the anchor points from all of the path objects from the subject list and use this graph to identify anchor points that overlap. For example, in Listing 1, below, V denotes the set of all anchor points from all path objects in the subject list, P denotes a list of all path segments connecting two anchor points from V. As shown in Listing 1, an anchor processing step at line 1, processes pairs of overlapping anchor points and removes one anchor point from each pair of overlapping anchor points from the list of anchor points V. Additionally, the segment list P is also updated accordingly to remove redundant segments.

Listing 1 Pre-Processing Steps

Require: Text Line V, P
1:    procedure GETANCHORPROCESSING(V, P)
2:        O ← overlapped anchor points pair in V
3:        for each $(v_1, v_2)$ in O do
4:            $P_{v_2}$ ← edges connected to $v_2$ in P
5:            for each p in $P_{v_2}$ do
6:                let say p in incident on $(v_2, x)$
7:                p ← $(v_1, x)$
8:    procedure PATHSPLITPROCESSING(V, P)
9:        for each v in V do
10:           $P_v$ ← list of path segment in P on which v coincides
11:           for each path $p(v_1, v, v_2)$ in $P_v$ do
12:               split p at v to get two new path segments $p_1$ and $p_2$
13:               $p_1$ ← $(v_1, v)$, $p_2$ ← $(v, v_2)$
14:               Remove $P_v$ from P
15:    GETANCHORPROCESSING(V, P)
16:    PATHSPLITPROCESSING(V, P)

A simplified tower example is shown in FIG. 4. As shown, three path objects 400-404 include a plurality of anchor points A1-A15. Accordingly, the original anchor list V is A1, A2, A3, A4, A5, A6, A7, A8, A9, A10, A11, A12, A13, A14, A15. In this example, path object 400 and path object 402 overlap in such a way that anchor points A3 and A4 of path object 402 overlap with anchor points A7 and A5, respectively, of path object 400, as shown at 406. In some embodiments, overlapping anchor points are identified by comparing the coordinates of anchor points from different path objects. If the coordinates match, then the anchor points are overlapping. In some embodiments, if the coordinates of a pair of anchor points from different path objects do not precisely match, but are within a threshold value (e.g., if the length of a vector connecting the two coordinates is less than a threshold value), then the pair of anchor points is considered to be overlapping. Accordingly, anchor list V is preprocessed to remove the overlapping anchor points, creating updated anchor point list V A1, A2, A3, A4, A6, A8, A9, A10, A11, A12, A13, A14, A15, in which anchor points A5 and A7 have been removed.

Although the overlapping anchor points from path object 400 have been removed and the overlapping anchor points from path object 402 have been retained, in alternative embodiments the overlapping anchor points from path object 402 are removed and those from path object 400 are retained. Alternatively, any combination of anchor points is removed and retained from the overlapping path objects, so long as only one anchor point from each pair of overlapping anchor points is removed. Likewise, if more than two anchor points overlap, then a single anchor point from the plurality of anchor points is retained.

Similarly, the segment list P is preprocessed to remove overlapping segments. The overlapping segments that are removed correspond to the overlapping anchor points that were removed. For example, the original segment list P includes: path object 404: (A8, A9), (A9, A10), (A10, A11), (A11, A12), (A12, A13), (A13, A14), (A14, A15); path object 402: (A1, A2), (A2, A3), (A3, A4), (A4, A1); and path object 400: (A5, A6), (A6, A7), (A7, A5). As a result of removing overlapping A5 and A7, segment (A5, A7) is removed from path object 400 and any other appearances of anchor points A5 and A7 being replaced with overlapping anchor points A4 and A3, respectively. In the example of FIG. 4, this results in updated segment list P: path object 404: (A8, A9), (A9, A10), (A10, A11), (A11, A12), (A12, A13), (A13, A14), (A14, A15); path object 402: (A1, A2), (A2, A3), (A3, A4), (A4, A1); and path object 400: (A4, A6), (A6, A3). Accordingly, path objects 402 and 404 are unchanged in updated segment list P, but path object 400 is updated to remove redundant segment (A5, A7), segment (A5, A6) is updated to segment (A4, A6), and segment (A6, A7) is updated to segment (A6, A3).

Figure 5:
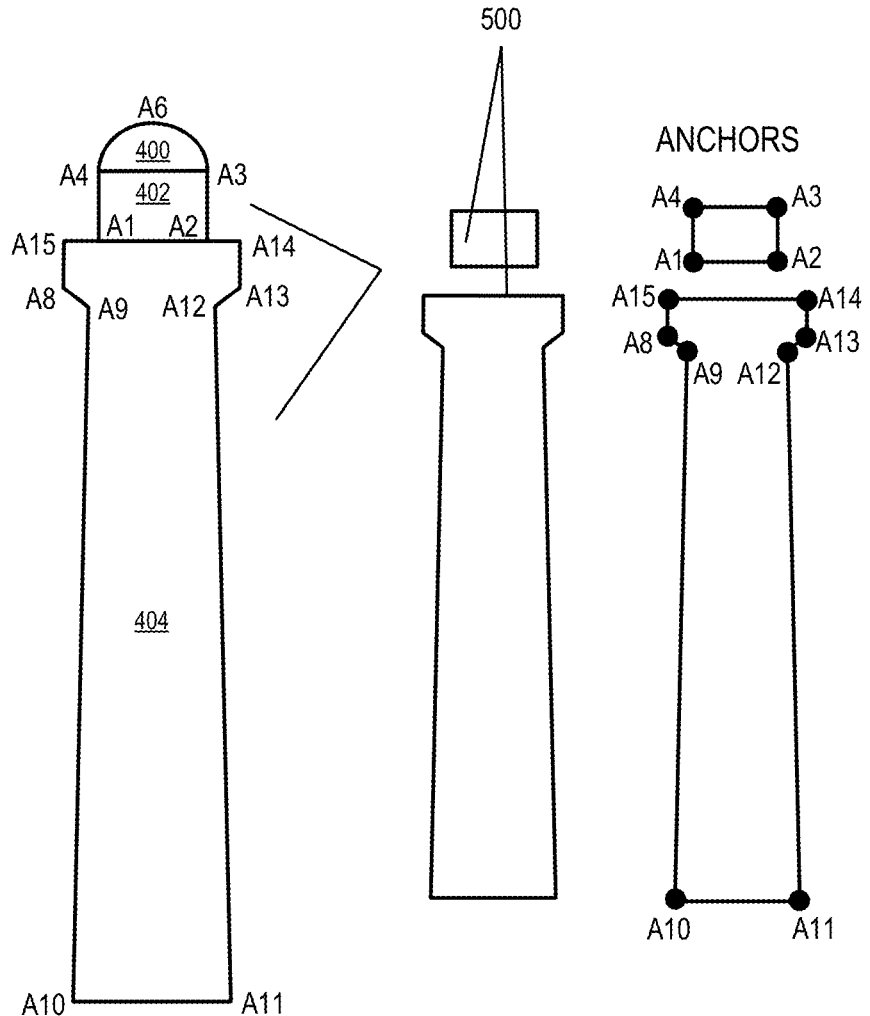
FIG. 5 illustrates another example of overlapping geometry, in accordance with an embodiment.

FIG. 5 illustrates another example of overlapping geometry, in accordance with an embodiment. As discussed above with respect to FIG. 4, a preprocessing step builds a graph of anchor points of the path objects in the subject list. Part of this preprocessing step is to remove overlapping anchor points, as discussed above. In addition to overlapping anchor points (e.g., where one anchor point occurs at the same coordinates as an anchor point from a different path object), in some instances an anchor point from one path object overlaps a segment of another path object. In such instances, embodiments split the overlapping segment due to the segment-anchor point overlap.

For example, as shown above in Listing 1, each segment on which a particular anchor point overlaps is identified as path segment p $(v_1, v, v_2)$, where p represents the current path segment being analyzed, $v_1$ and $v_2$ represent the anchor points at either end of the current path segment, and v represents the overlapping anchor point. The path segment p is then split into two new path segments $p_1$ and $p_2$, where path segment $p_1$ is $(v_1, v)$ and $p_2$ is $(v, v_2)$. This path segment splitting is depicted visually in FIG. 5 and FIGS. 6A and 6B.

As shown in FIG. 5, and as discussed above with respect to FIG. 4, three path objects 400-404 include a plurality of anchor points A1-A15. After preprocessing the overlapping anchor points of the path objects, the updated anchor point list is determined to be V A1, A2, A3, A4, A6, A8, A9, A10, A11, A12, A13, A14, A15, in which anchor points A5 and A7 have been removed. Additionally, the path segment list is also updated to remove the overlapping anchor points, as discussed above, resulting in updated path segment list P: path object 404: (A8, A9), (A9, A10), (A10, A11), (A11, A12), (A12, A13), (A13, A14), (A14, A15); path object 402: (A1, A2), (A2, A3), (A3, A4), (A4, A1); and path object 400: (A4, A6), (A6, A3).

During the preprocessing step illustrated in FIG. 5, anchor points that overlap with a segment are identified. For example, path object 402 overlaps with path object 404, as shown at 500. As a result, anchor points A1 and A2 of path object 402 overlap with segment (A14, A15) of path object 404. In some embodiments, an anchor point-segment overlapped is identified by comparing the coordinates of the anchor points with the vector characteristics of each path segment to determine whether the coordinates of the anchor point of one path object fall on (e.g., overlap with) a path segment of a different path object.

Figure 6A:
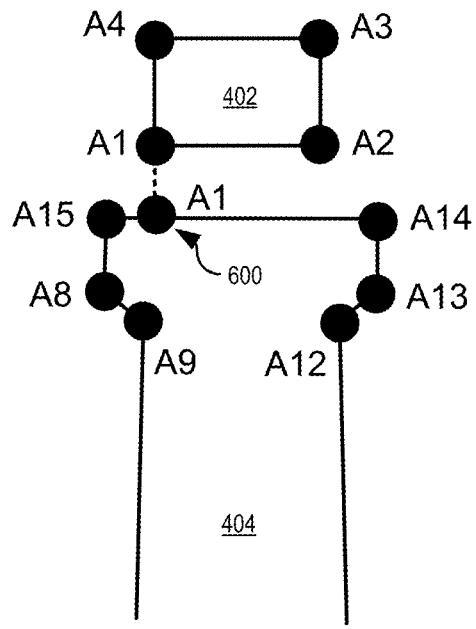
FIGS. 6A and 6B illustrates an example of segment splitting based on overlapping anchor points, in accordance with an embodiment.
Figure 6B:
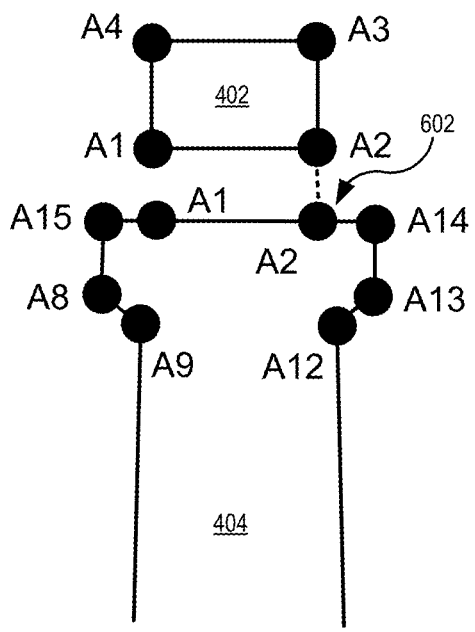

FIGS. 6A and 6B illustrates an example of segment splitting based on overlapping anchor points, in accordance with an embodiment. As shown in FIG. 6A, anchor point A1 of path object 402 overlaps with path segment (A15, A14) of path object 404. Accordingly, path segment (A15, A14) is split into segments (A15, A1) and (A1, A14). as shown at 600. Additionally, anchor point A2 of path object 402 also overlaps with path segment (A15, A14) of path object 404. After splitting path segment (A15, A14) into (A15, A1) and (A1, A14), anchor point A2 overlaps with path segment (A1, A14). As such, path segment (A1, A14) is split into (A1, A2) and (A2, A14). This results in updated path segment list P: path object 404: (A8, A9), (A9, A10), (A10, A11), (A11, A12), (A12, A13), (A13, A14), (A14, A2), (A2, A1), (A1, A15); path object 402: (A1, A2), (A2, A3), (A3, A4), (A4, A1); and path object 400: (A4, A6), (A6, A3).

Once preprocessing of the subject list is complete, the updated anchor list and updated segment list have removed overlapping anchor points and path segments, as discussed above. The updated anchor list and updated segment list are then used to generate graph G. As discussed, the graph G includes each anchor point in the path objects as a graph node and each segment connecting two anchor points as a path connecting two corresponding nodes in the graph G. The graph G is used to identify shortest path out of the anchors and path segments when determining the area of the vector graphic to highlight.

The above examples describe techniques to generate a graph of the nodes of a vector graphic. In some embodiments, a Boolean operation is performed to merge multiple path objects into a single path object. As a result of the Boolean operation, any overlapping segments and anchor points have been removed. Accordingly, in some embodiments, the nodes to be included in the graph are obtained by performing a Boolean operation on the vector graphic. This resulting graph is then usable similarly to the graph generated as described above when generating the highlight path.

FIGS. 7A-7D illustrate examples of generating a highlight path object on straight line objects and on curved objects, in accordance with an embodiment. After the preprocessing steps described above to generate a graph of the anchor points and path segments of the vector graphic, embodiments then detect an optimal trajectory connecting user-selected nodes. This graph G is used to find the optimal trajectory (e.g., shortest trajectory) which covers the user selected nodes (e.g., start, end, and, optionally, intermediate nodes). In some embodiments, while nodes are being marked, the cursor movement is monitored as discussed above. The cursor movement is used to determine whether the cursor overlaps any unselected anchor points or path objects. For example, any potential overlapping anchor points or path objects are added to a probable anchor list V' and a probable path object list P'. Weights are then calculated, as shown below in Listing 2, for each node of the graph G. The weights for probable anchor points and path objects are adjusted by a probability factor $\theta_v$ for anchor points in V' and $\theta_p$ for path objects in P'. Using the weights, an optimal trajectory between the start node and the end node is then determined (e.g., the trajectory having the lowest aggregate weight).

---

Listing 2 Trajectory Detection

Require: Text Line V, P
1:     procedure TRAJECTORYDETECTION(V, P, $v_1$, $v_2$)
2:         $w_p \leftarrow$ length of path segment p
3:         $w_1$ and $w_2 \leftarrow$ cost factor for V' and P'
4:         $w_p \leftarrow w_p + w_1 * \theta_p$
5:         $w_v \leftarrow -w_2 * \theta_v$
6:         Find the shortest path between $v_s$ and $v_e$ in G After the final trajectory of path highlight is found, then the highlight path is created. Highlight path creation is based on highlight parameters, namely: Spread and Offset. Spread and offset define the appearance of the highlight. Depending on the underlying geometry of the trajectory, the highlight path creation is implemented in different ways. For example, for straight line geometry, the highlight path is generated by identifying highlight nodes for each anchor point being highlighted, based on the spread value provided by the user (or a default value). Where the underlying geometry includes curved segments, the highlight path is calculated to maintain a continuity and smooth curvature of the highlight path similar to the original path trajectory. There should not be sharp bumps.

As shown below in Listing 3, for zero offset highlighting, a Trajectory T and the spread parameter D are used to determine the highlight path. The trajectory T is an un-branched tree with an ordered set of n nodes denoted by $v_i$, and $p_i$ is the Bezier path segment connecting $v_i$ and $v_{i+1}$. In some embodiments, the first and last node are kept as sharp corners for highlights. Alternatively, the first and last node are smoothed with the original trajectory. For a particular node, the angle between the previous segment and the next segment is determined. For straight line segments, the angle is of the straight-line segment itself. For curved segments, an angular bisector is determined using the in and out control points of the previous and next segments. The highlight node is then placed along the angular bisector a distance from the anchor node being evaluated determined by the spread value. Therefore, a larger spread value leads to a larger area being highlighted and a lower spread value leads to a lower spread value being highlighted. When the detect the angle bisector of the previous segment and next segment to find the corresponding highlight node. This process is depicted visually in FIGS. 7A-7D.

Figure 7A:
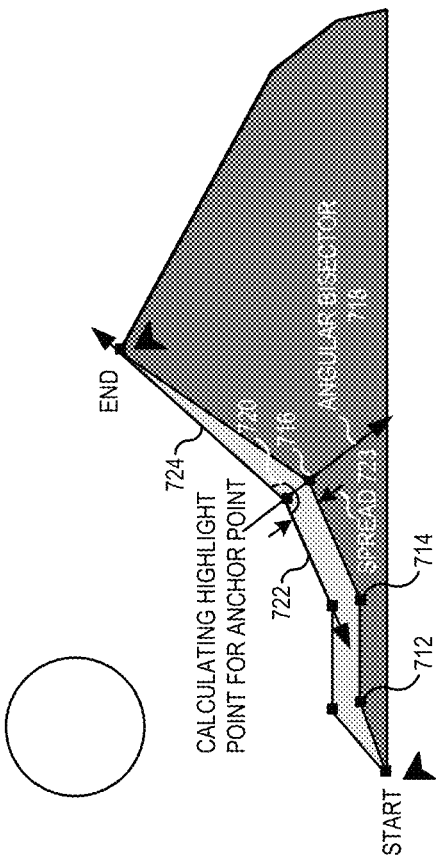
FIGS. 7A-7D illustrate examples of identifying a highlight path object on straight line objects and on curved objects, in accordance with an embodiment.

As shown in FIG. 7A, a mountain-shaped path object 700 has been created. The highlight trajectory includes start node 702, intermediate nodes 704-708, and end node 710. As discussed, the user selects each node and uses a modifier key or other user input to designate the nodes as starting, intermediate, or ending. In some embodiments, the user selects start node 702 and end node 710 without selecting intermediate nodes 704-708. In such instances, the node highlighting system identifies the intermediate nodes based on the trajectory of the user's cursor, as described above. For the highlight path, the start node and the end node remain the same, therefore only highlight nodes corresponding to the intermediate nodes are determined.

Figure 7B:
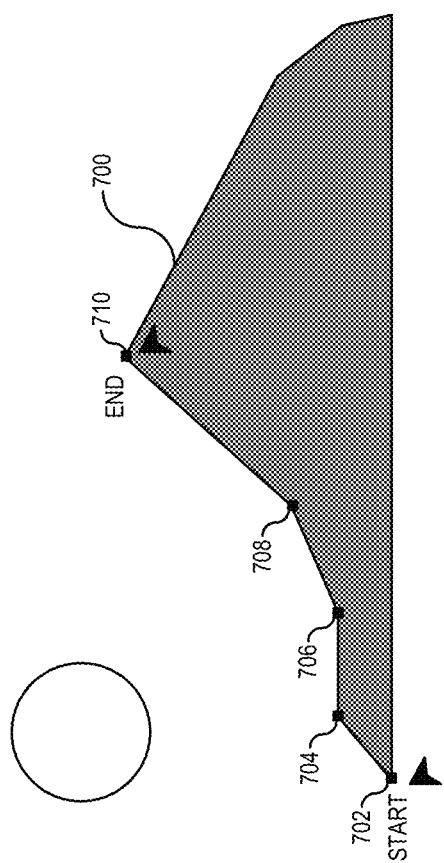

For example, FIG. 7B depicts identifying highlight nodes 712, 714, and 716 for intermediate nodes 704-708. For example, for node 708 the location of corresponding highlight node 716 is determined. As discussed, the node highlighting system first determines an angle 720 between previous segment 722 and next segment 724. Because these segments are straight lines, this angle is determined based on the angle of each segment. An angular bisector is then determined going through node 708. The location of the highlight node 716 then is on this angular bisector line at a distance D from node 708, where D corresponds to the spread distance 723 specified in the highlight parameters. In some embodiments, D is specified by the user (e.g., through a user interface element) or a default value of D is used. This process is repeated for each intermediate node.

Figure 7C:
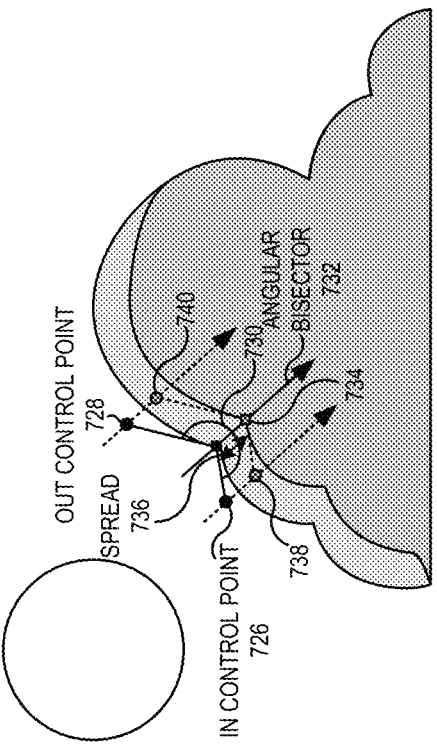
Figure 7D:
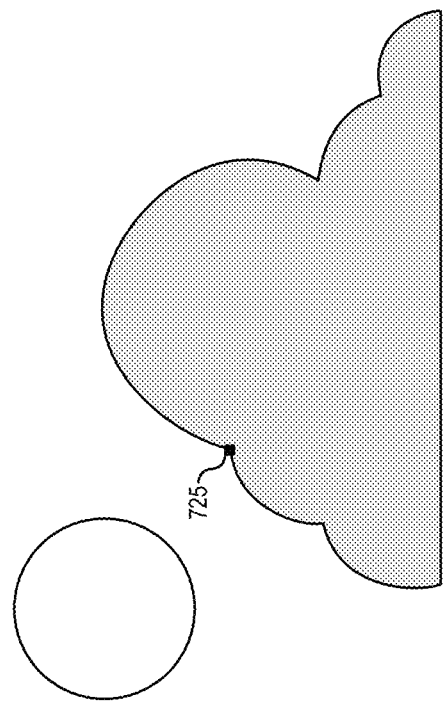

FIG. 7C shows a cloud-shaped path object comprising a plurality of curved segments and a straight-line segment. Unlike the example of FIGS. 7A and 7B, where the angle of the previous segment and next segment are used to determine the angle bisector, in the example of FIGS. 7C and 7D, the control points of the anchor point 725 are used. Also, to find the new control points, we follow the original control

---

Listing 3: Highlight Path without offset

Require: T, D
1: procedure GETHIGHLIGHTNODE(v, $v_{next}$, $v_{prev}$, offset(δ), spread(D))
2:  if $p_{prev}$ is curve then
3:   $\vec{l}_{prev}$ ← straight line connecting ($c_{in}(v)$, v)
4:  else
5:   $\vec{l}_{prev}$ ← straight line connecting ($v_{prev}$, v)
6:  if p is curve then
7:   $\vec{l}_{next}$ straight line connecting (v, $c_{out}(v)$)
8:  else
9:   $\vec{l}_{next}$ straight line connecting (v, $v_{next}$)
10: $\vec{\lambda} \leftarrow \frac{(\vec{l}_{prev} + \vec{l}_{next})}{2}$  ▷ angular bisector, same procedure for control points.
11: $\vec{v}' \leftarrow D * \vec{\lambda} + \vec{p}$  ▷ direction can be decided based on internal region testing
12: return $\vec{v}'$
13: procedure INITIALIZE(T)
14:  H ← T
15:  $c_{in}(v_o) = p_o(v_0)$,
16:  $c_{out}(v_n) = p_o(v_n)$
17:  return H
18:
19: procedure HIGHLIGHTPATH(T, spread(D) )
20:  H ← INITIALIZE(T)
21:  for each $v_i$ in H i∈ (n − 1,1) do
22:   $v_i'$ ← GETHIGHLIGHTNODE($v_i$, $v_{i+1}$, $v_{i-1}$, D)  ▷ Get the new highlight node for given spread
23:   swap $c_{in}(v_i')$, $c_{out}(v_i')$
24:   push $v_i'$ in H
25:  Mark H as close path.

point direction and length from the new node position. For example, the angle 730 between a line connecting the in control point 726 and anchor point 725 and a line connecting the out control point 728 and anchor point 725 is determined. The angular bisector 732 of this angle 730 passing through anchor point 725 is then determined and corresponding highlight node 734 is determined to be on this angular bisector a distance D corresponding to the spread parameter 736 from the anchor point 725. Additionally, the new control points 738, 740 for the highlight node 734 are determined using the original control point direction and length from the new highlight node position. For example, the angle and length of the lines connecting the anchor point 725 and the in and out control points 726, 728 are used but translated to the highlight node position. Each additional anchor point in the trajectory of the highlight path is then similarly determined.

For either straight-line paths, curved paths, or a mix of the two, once the corresponding highlight nodes are determined, then a closed path object is determined. The closed path object comprising the anchor points from the trajectory and the highlight nodes.

Figure 8:
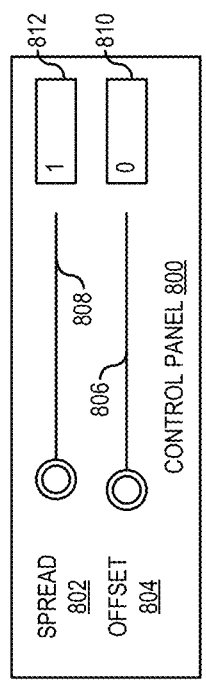
FIG. 8 illustrates an example of a zero-offset highlight, in accordance with an embodiment.
Figure 8:
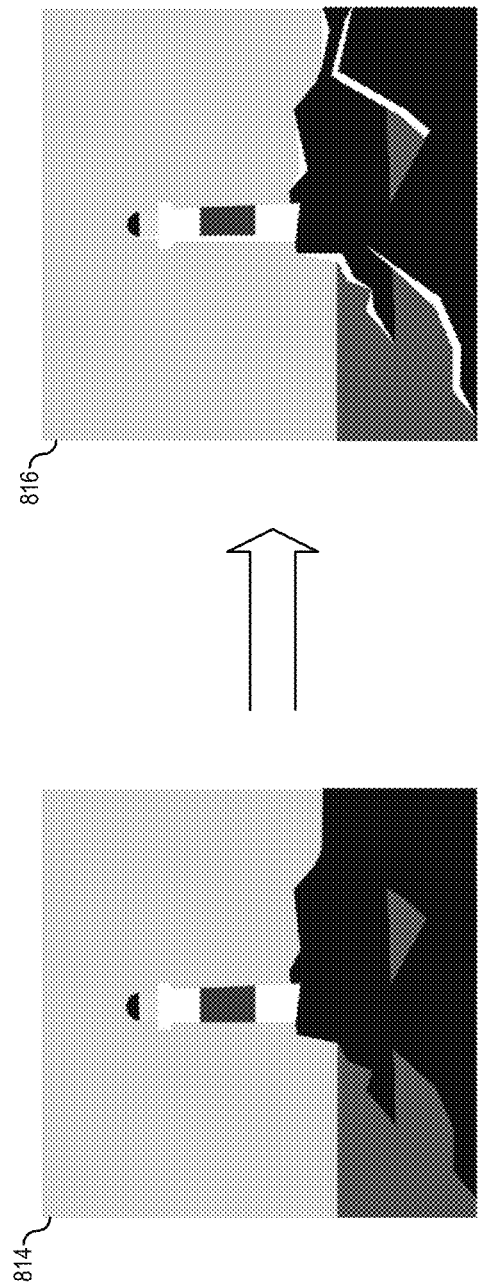

FIG. 8 illustrates an example of a zero-offset highlight, in accordance with an embodiment. As shown in FIG. 8, in some embodiments, a content design system includes a graphical user interface element which allows the user to provide and/or change highlight parameters. In the example of FIG. 8, the GUI element is a control panel 800, which includes spread 802 and offset 804 input elements. For example, the user sets the spread and offset values using sliders 806, 808 and/or via text boxes 810, 812. As the user adjusts these values, the highlights of vector graphic change from no highlighting as shown in vector graphic 814 to highlighting, as shown in vector graphic 816. In this example, a minimum spread value of 1 is used and no offset value is used. Therefore, the highlight is added at the edges of the trajectories that were previously identified by the user using techniques discussed above.

Figure 9:
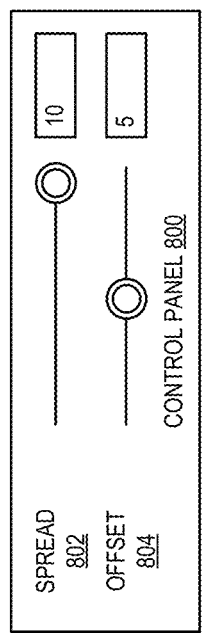
FIG. 9 illustrates an example of an offset highlight, in accordance with an embodiment.
Figure 9:
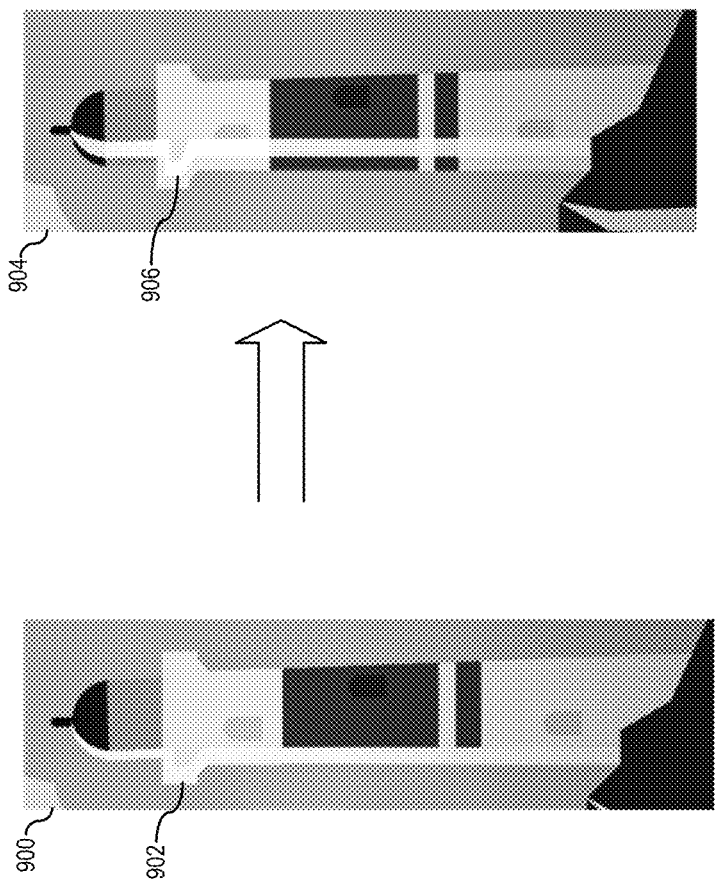

FIG. 9 illustrates an example of an offset highlight, in accordance with an embodiment. In addition to the zero-offset highlights discussed above, embodiments also support offset highlights, as shown in FIG. 9. For offset highlighting, the node highlighting system determines the highlighting twice as shown below in Listing 4. First the highlight path is identified, as discussed above. Then an offset from the highlight path is identified. For example, so if the original anchor points are Start, A, B, C, End. then the highlight path is determined as Start', A', B', C' End' using the spread value, as discussed above. Then an offset from the highlight path is determined using the spread value and the offset value (e.g., D+δ), resulting in offset highlight nodes A", B", C" (as the start and end nodes of the offset highlight path and the highlight path are the same nodes, resulting in a closed path object). A closed offset highlight path is then generated which includes the highlight path nodes and the offset highlight path nodes.

| Listing 4 Highlight Path offset |
| --- |
| Require: T, D, δ |
| 1:     procedure HIGHLIGHTPATH( T, D, δ ) |
| 2:         H ← empty trajectory |
| 3:         for each $v_i$ in T i∈(n − 1,1) do     Get the new highlight node with given spread |
| 4:             $v_i'$ ← GETHIGHLIGHTNODE($v_i$, $v_{i+i}$, $v_{i−1}$, D) |
| 5:             push $v_i'$ in H |

| Listing 4 Highlight Path offset -continued |
| --- |
| 6:         H' ← empty trajectory |
| 7:         for each $v_i$ in T i∈(n − 1,1) do     Get the new highlight node with given spread and offset |
| 8:             $v_i'$ ← GETHIGHLIGHTNODE($v_i$, $v_{i+1}$, $v_{i−1}$, D + δ) |
| 9:             push $v_i'$ in H' |
| 10:        H ← H' + REVERSE(H) |
| 11:        return H |

For example, as shown in FIG. 9, vector graphic 900 first has a highlight path 902 created. When the offset value 804 is modified, as shown in vector graphic 904, then the offset highlight path 906 is determined, which is offset from the original highlight path based on the offset value. Because the highlights are placed within the vector objects, this results in the highlight path 902 being offset to the right, as shown at 906.

Figure 10:
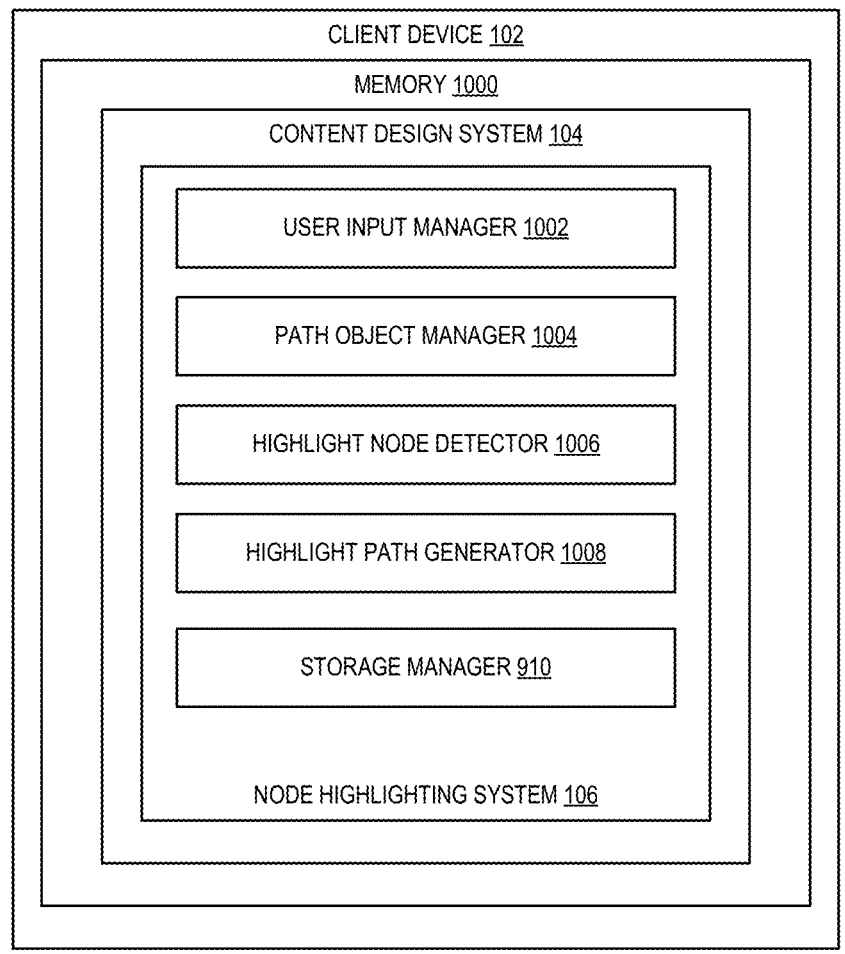
FIG. 10 illustrates a schematic diagram of a content design system in accordance with one or more embodiments.

FIG. 10 illustrates a schematic diagram of a content design system in accordance with one or more embodiments. In particular, FIG. 10 shows a schematic diagram of the highlighting system 106, the client device 102, and the content design system 104 described above in relation to FIG. 1. As mentioned in relation to FIG. 1, in one or more embodiments, some or all of the components of the highlighting system 106 are implemented separately from the content design system 104 and the client device 102, such as on a server device or other electronic device in communication with client device 102.

As shown, the client device 102 includes memory 1000, including volatile memory, non-volatile memory, storage media, etc. as further described below with respect at least to FIG. 14. The highlighting system is stored in memory as program code, data structures, etc. and includes a user input manager 1002, a path object manager 1004, a highlight node detector 1006, a highlight path generator 1008, and a storage manager 1010.

The node highlighting system 106 includes a user input manager 1002 that allows users to provide input to the highlighting system. For example, the user input manager 1002 allows users to select one or more vector graphics-based objects to edit. In some embodiments, the user input manager 1002 enables a user to select one or more anchor points of path objects in a vector graphics file stored or accessible by storage manager 1010. Additionally, the user input manager 1002 allows users to identify the anchor points as start, end, or intermediate anchor points using a modifier key or other user input. The user input manager 1002 also enables the user to provide highlight parameters, such as a spread value, an offset value, etc.

As illustrated in FIG. 10, the content design system 104 also includes a path object manager 1004. Path object manager is responsible for preprocessing the input vector graphic. As discussed above, preprocessing includes identifying overlapping anchor point pairs and identifying anchor points that overlap with segments. In some embodiments, when a vector graphic is created or loaded for editing, the path object manager identifies all path objects present in the vector graphic. In some embodiments, the path object manager identifies path objects as the user selects nodes to be highlighted. The path object manager 1004 creates a list of anchor points and a list of segments connecting those anchor points. When the path object manager 1004 determines that an anchor point overlaps another anchor point (e.g., based on coordinates associated with the anchor points), the path object manager removes one of the overlapping anchor points from the list of anchor points. The path object manager 1004 also updates the segment list accordingly, by replacing any references to the removed anchor point with the remaining anchor point.

The path object manager further preprocesses the vector graphic by identifying any anchor points that overlap with a segment from the segment list. The path object manager 1004 splits the segment at the overlapping anchor point, creating two segments. This process continues until all segments of the overlapping anchor point-segment pairs have been split. The segment list is then updated by replacing any references to segments that have been split with the resulting split segments. Using the updated anchor point list and segment list, the path object manager then creates a graph representing the path objects in the input vector graphic, where each node of the graph corresponds to an anchor point and each connection corresponds to the segment connecting that anchor point to another anchor point.

As illustrated in FIG. 10, the content design system 104 also includes a highlight node detector 1006. Highlight node detector 1006 identifies the path objects within a given vector graphic that are to be highlighted. For example, as the user selects anchor points along the path segment to be highlighted, the highlight node detector 1006 adds the path objects associated with those anchor points to a subject list. In some embodiments, as discussed above, the highlight node detector 1006 also monitors the cursor as the user selects the anchor points. As the cursor typically traces a trajectory that tracks the path segment to be highlighted, the highlight node detector 1006 further identifies non-selected anchor points and/or path objects. For example, while the user is marking nodes, the path object manager tracks the cursor's movements and detects any path objects over which the cursor traverses. The highlight node detector 1006 associates the path objects and/or anchor points with a probability factor indicating the likelihood that a given anchor point is to be highlighted. In some embodiments, the highlight node detector 1006 generates a highlight trajectory which includes an ordered list of nodes from the start node to the end node and including any intermediate nodes that have been explicitly identified by the user (e.g., via a modifier key or other input) or that have been inferred based on the trajectory of the user's cursor.

As illustrated in FIG. 10, the content design system 104 also includes a highlight path generator 1008. Highlight path generator uses the highlight trajectory generated by the highlight node detector to generate the highlight path. In some embodiments, the highlight path generator 1008 generates a highlight node corresponding to each node in the trajectory, except for the start node and the end node. The highlight nodes are generated based on highlight parameters, including a spread parameter and an offset parameter. The spread parameter corresponds to a width of the highlight and the offset parameter corresponds to a distance from the highlight path where the highlight occurs in the vector graphic. In some embodiments, a highlight node is generated for a node from the trajectory by determining an angular bisector for the node. As discussed, when the previous segment and next segment are straight lines, the angular bisector is determined based on the angle formed by these straight lines at the anchor point. When the previous segment and next segment are curves, the angular bisector is determined based on the angle formed between the node and the in control point and the out control point for that node. Once the angular bisector is found, the highlight node is placed on the angular bisector in the interior of the vector graphic at a distance determined from the spread parameter. The trajectory nodes and the highlight nodes are then used to create a closed path object which is the highlight path. As discussed above, for offset highlights, a second set of highlight nodes (e.g., offset highlight nodes) are identified at a distance equal to the spread parameter. The offset highlight path is then formed from the set of highlight nodes and the set of offset highlight nodes.

As illustrated in FIG. 10, the content design system 104 also includes a storage manager 1010. In general, the storage manager 1010 maintains, stores, organizes, and/or retrieves data associated with the highlighting system 106. For example, the storage manager 1010 maintains a graph represented the subject path objects that is used to identify the highlight path, as described above. Further, the storage manager 1010 communicates with other components of the highlighting system 106 to facilitate identifying nodes to be highlighted and generating a highlight path.

Each of the components 1002-1010 of the content design system 104 and their corresponding elements (as shown in FIG. 10) are in communication with one another using any suitable communication technologies. It is recognized that although components 1002-1010 and their corresponding elements are shown to be separate in FIG. 10, any of components 1002-1010 and their corresponding elements are combined into fewer components, such as into a single facility or module, divided into more components, or configured into different components as serves a particular embodiment.

The components 1002-1010 and their corresponding elements comprise software, hardware, or both. For example, the components 1002-1010 and their corresponding elements comprise one or more instructions stored on a computer-readable storage medium and executable by processors of one or more computing devices. When executed by the one or more processors, the computer-executable instructions of the content design system 104 cause a client device and/or a server device to perform the methods described herein. Alternatively, the components 1002-1010 and their corresponding elements comprise hardware, such as a special purpose processing device to perform a certain function or group of functions. Additionally, the components 1002-1010 and their corresponding elements comprise a combination of computer-executable instructions and hardware.

Furthermore, the components 1002-1010 of the content design system 104, for example, are implementable as one or more stand-alone applications, as one or more modules of an application, as one or more plug-ins, as one or more library functions or functions that are called by other applications, and/or as a cloud-computing model. Thus, the components 1002-1010 of the content design system 104 are implemented as a stand-alone application, such as a desktop or mobile application. Furthermore, the components 1002-1010 of the content design system 104 are implemented as one or more web-based applications hosted on a remote server. Alternatively, or additionally, the components of the content design system 104 are implemented in a suit of mobile device applications or "apps." To illustrate, the components of the content design system 104 are implemented in a digital image editing application, including but not limited to ADOBE® ILLUSTRATOR®, ADOBE® PHOTOSHOP®, or ADOBE® CREATIVE CLOUD®. "ADOBE," "ILLUSTRATOR," "PHOTOSHOP," and "CREATIVE CLOUD" are either registered trademarks or trademarks of Adobe Systems Incorporated in the United States and/or other countries.

Figure 11:
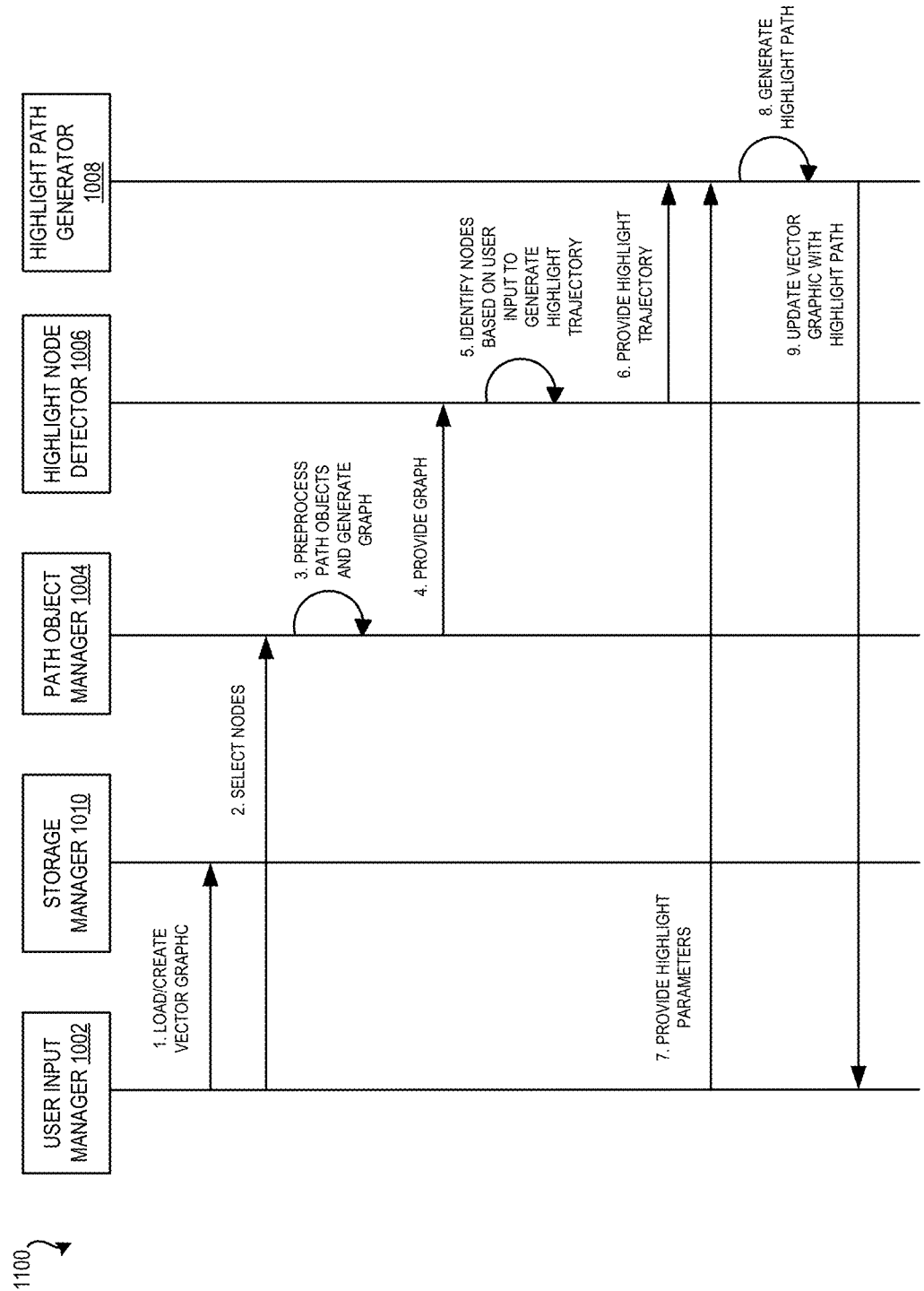
FIG. 11 illustrates a sequence diagram of a content design system in accordance with one or more embodiments.

FIG. 11 illustrates a sequence diagram 1100 of a content design system in accordance with one or more embodiments. As shown in FIG. 11, a user loads an existing vector graphic from a file using user input manager 1002 via storage manager 1010 at numeral 1. In some embodiments, the user creates a new vector graphic, e.g., by opening to new canvas/workspace in a vector graphics application and drawing the vector graphic. The user then selects nodes (e.g., anchor points) of the path object(s) in the vector graphic to be highlighted, at numeral 2. As discussed, the user identifies a start node, an end node, and optionally one or more intermediate nodes. In some embodiments, the user identifies a given node by selecting it with a cursor (e.g., mouse click, touch gesture, etc.) while simultaneously holding a modifier key on a keyboard. Alternatively, the user selects a plurality of nodes and then identifies nodes as start, end, or intermediate via a GUI element.

At numeral 3, the path object manager 1004 processes the path objects of the vector graphic. In some embodiments, the path object manager 1004 preprocesses the path objects when the vector graphic is first loaded and preprocesses all path objects in the vector graphic. Alternatively, the path object manager 1004 preprocesses the path objects as the user selects nodes at numeral 2. While the user selects nodes, the nodes explicitly selected are recorded. Additionally, as discussed, the user's cursor position is monitored and any path objects and/or anchor points that the cursor passes over or near are also recorded. The path objects that are either explicitly selected or those that are inferred from the user's cursor trajectory are then preprocessed. As discussed, preprocessing includes identifying overlapping pairs of anchor points and anchor points that overlap segments. An anchor point list is then updated to remove one anchor point from each pair of overlapping anchor points and a segment list is updated to reflect the updated anchor point list. Additionally, segments that overlap with an anchor point are split at the anchor point and the segment list is updated to reflect these new split segments. The updated anchor point list and segment list are then used to construct a graph representing at least some of the path objects of the vector graphic. In the graph, each node corresponds to an anchor point from the updated anchor point list and each connection corresponds to a segment from the updated segment list. This graph is then provided to highlight node detector 1006 at numeral 4.

At numeral 5, the highlight node detector 1006 identifies a highlight trajectory based on the graph and user input. For example, the trajectory is an ordered list of nodes from the start node to the end node which includes any intermediate nodes, either explicitly selected by the user or determined from the user's cursor's trajectory. The highlight trajectory is then provided to highlight path generator 1008 at numeral 6. At numeral 7, the user provides highlight parameters, such as a spread parameter and an offset parameter. As discussed, the spread parameter corresponds to a width of the highlight path and the offset parameter corresponds to a distance from the edge or surface defined by the highlight trajectory where the highlight path appears in the vector art.

As discussed, the highlight path generator generates the highlight path at numeral 8 by identifying highlight nodes corresponding to the nodes of the highlight trajectory. For example, In, a highlight node is generated for a node from the trajectory by determining an angular bisector for the node. As discussed, when the previous segment and next segment are straight lines, the angular bisector is determined based on the angle formed by these straight lines at the anchor point. When the previous segment and next segment are curves, the angular bisector is determined based on the angle formed between the node and the in control point and the out control point for that node. Once the angular bisector is found, the highlight node is placed on the angular bisector in the interior of the vector graphic at a distance determined from the spread parameter. The trajectory nodes and the highlight nodes are then used to create a closed path object which is the highlight path. As discussed above, for offset highlights, a second set of highlight nodes (e.g., offset highlight nodes) are identified at a distance equal to the spread parameter. The offset highlight path is then formed from the set of highlight nodes and the set of offset highlight nodes. At numeral 9, the resulting highlight path is then added to the vector graphic and displayed to the user.

Figure 12:
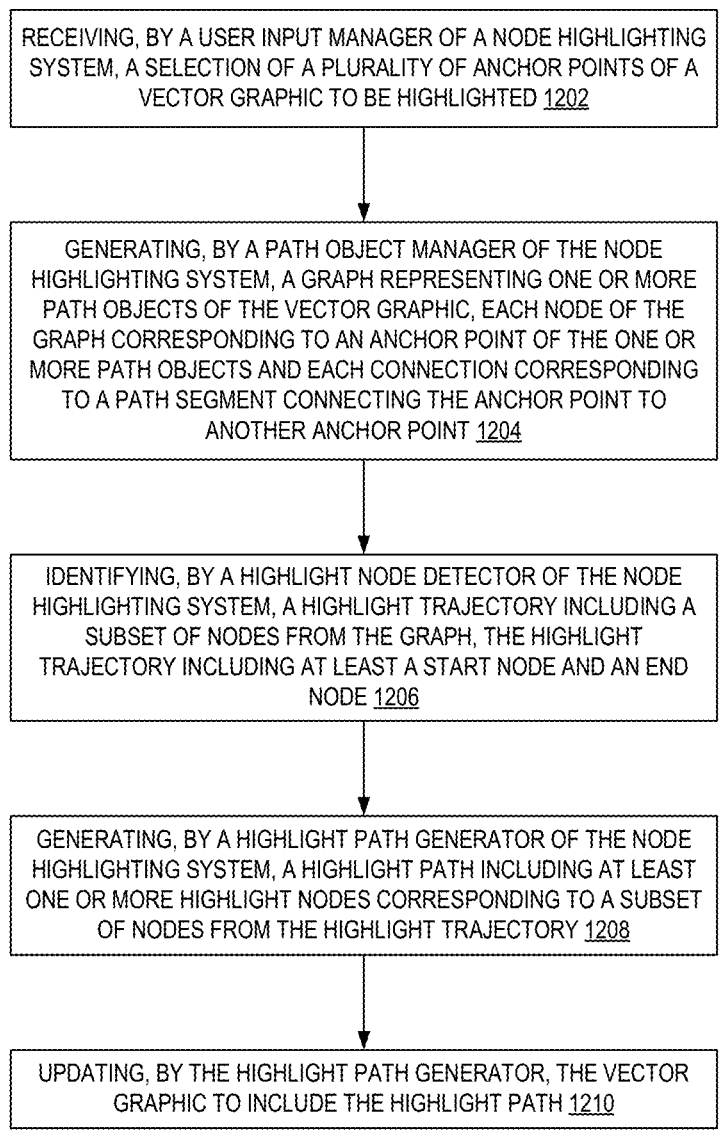
FIG. 12 illustrates a flowchart of a series of acts in a method of node highlighting of vector-based shapes in accordance with one or more embodiments.

FIGS. 1-11, the corresponding text, and the examples, provide a number of different systems and devices that allows a user to facilitate selection of target individuals within digital visual media. In addition to the foregoing, embodiments are described in terms of flowcharts comprising acts and steps in a method for accomplishing a particular result. For example, FIG. 12 illustrates a flowchart of an exemplary method in accordance with one or more embodiments. The method described in relation to FIG. 12 is performable with fewer or more steps/acts or the steps/acts are performable in differing orders. Additionally, the steps/acts described herein are repeatable or performable in parallel with one another or in parallel with different instances of the same or similar steps/acts.

FIG. 12 illustrates a flowchart of a series of acts in a method of node highlighting of vector-based shapes in accordance with one or more embodiments. In one or more embodiments, the method 1200 is performed in a digital medium environment that includes the content design system 104. The method 1200 is intended to be illustrative of one or more methods in accordance with the present disclosure and is not intended to limit potential embodiments. Alternative embodiments include additional, fewer, or different steps than those articulated in FIG. 12.

As illustrated in FIG. 12, the method 1200 includes an act 1202 of receiving, by a user input manager of a node highlighting system, a selection of a plurality of anchor points of a vector graphic to be highlighted. As discussed, the node highlighting system, in some embodiments, is implemented as part of a content design system running on an electronic device (e.g., a client device, server device, or other electronic device). The content design system provides a graphical user interface through which the user interacts with the content design system, enabling the user to select anchor points of the vector graphic. In some embodiments, the user designates one or more of the anchor points as a start node, an end node, and one or more intermediate nodes using another user input. For example, the user selects the nodes using a mouse or other pointing device and simultaneously presses a modifier key (e.g., corresponding to start, end, or intermediate) on a keyboard.

As illustrated in FIG. 12, the method 1200 includes an act 1204 of generating, by a path object manager of the node highlighting system, a graph representing one or more path objects of the vector graphic, each node of the graph corresponding to an anchor point of the one or more path objects and each connection corresponding to a path segment connecting the anchor point to another anchor point. In some embodiments, generating the graph further includes generating an anchor point list comprising a plurality of anchor points associated with the one or more path object, generating a segment list comprising a plurality of segments connecting the plurality of anchor points, identifying at least one overlapping anchor point pair, updating the anchor point list to remove one anchor point from the at least one overlapping anchor point pair to create an updated anchor point list, and updating the segment list based on the updated anchor point list to create an updated segment list. In some embodiments, generating the graph further comprises identifying at least one anchor point overlapping at least one segment, splitting the at least one segment into two segments at the at least one anchor point, updating the segment list based on the split at least one segment to create the updated segment list, and generating the graph based on the updated anchor point list and the updated segment list.

As illustrated in FIG. 12, the method 1200 includes an act 1206 of identifying, by a highlight node detector of the node highlighting system, a highlight trajectory including a subset of nodes from the graph, the highlight trajectory including at least a start node and an end node. In some embodiments, identifying the highlight trajectory further includes identifying at least a start node and an end node from the graph, the start node and the end node labeled by a user when corresponding anchor points were selected by the user. In some embodiments, identifying the highlight trajectory further includes identifying at least one intermediate node based on a cursor trajectory during selection of the plurality of anchor points, the at least one intermediate node corresponding to an anchor point not selected by the user.

As illustrated in FIG. 12, the method 1200 includes an act 1208 of generating, by a highlight path generator of the node highlighting system, a highlight path including at least one or more highlight nodes corresponding to a subset of nodes from the highlight trajectory. In some embodiments, generating the highlight path further includes determining an angle associated with a first node from the highlight trajectory based on a previous segment and a next segment, determining an angular bisector of the angle associated with the first node, and determining a location of a first highlight node corresponding to the first node along the angular bisector based on a spread parameter, wherein the highlight path includes a plurality of nodes from the highlight trajectory and at least the first highlight node to form a closed highlight path object. In some embodiments, the previous segment and the next segment are straight line segments and wherein the angle associated with the first node is determined based on an angle associated with the previous segment and an angle associated with the next segment. In some embodiments, the previous segment and the next segment are curved segments and wherein the angle associated with the first node is determined based on an angle associated with a line connecting an in control point to the first node and an angle associated with a line connecting an out control point to the first node.

In some embodiments, generating the highlight path further includes for each node from the highlight trajectory determining an angle associated with a node from the highlight trajectory based on a previous segment and a next segment, determining an angular bisector of the angle associated with the node, determining a location of a highlight node corresponding to the node along the angular bisector based on a spread parameter, and adding the highlight node to the highlight path. Additionally, generating the highlight path further includes for each highlight node from the highlight path, determining a location of an offset highlight node corresponding to the node along the angular bisector based on a spread parameter and an offset parameter, wherein the highlight path includes a plurality of highlight nodes and a plurality of offset highlight nodes to form a closed highlight path object.

As illustrated in FIG. 12, the method 1200 includes an act 1210 of updating, by the highlight path generator, the vector graphic to include the highlight path. In some embodiments, updating the vector graphic includes adding the highlight path to the vector graphic along the highlight trajectory. In some embodiments, the highlight path is filled with a color, pattern, or other fill type based on user input.

Figure 13:
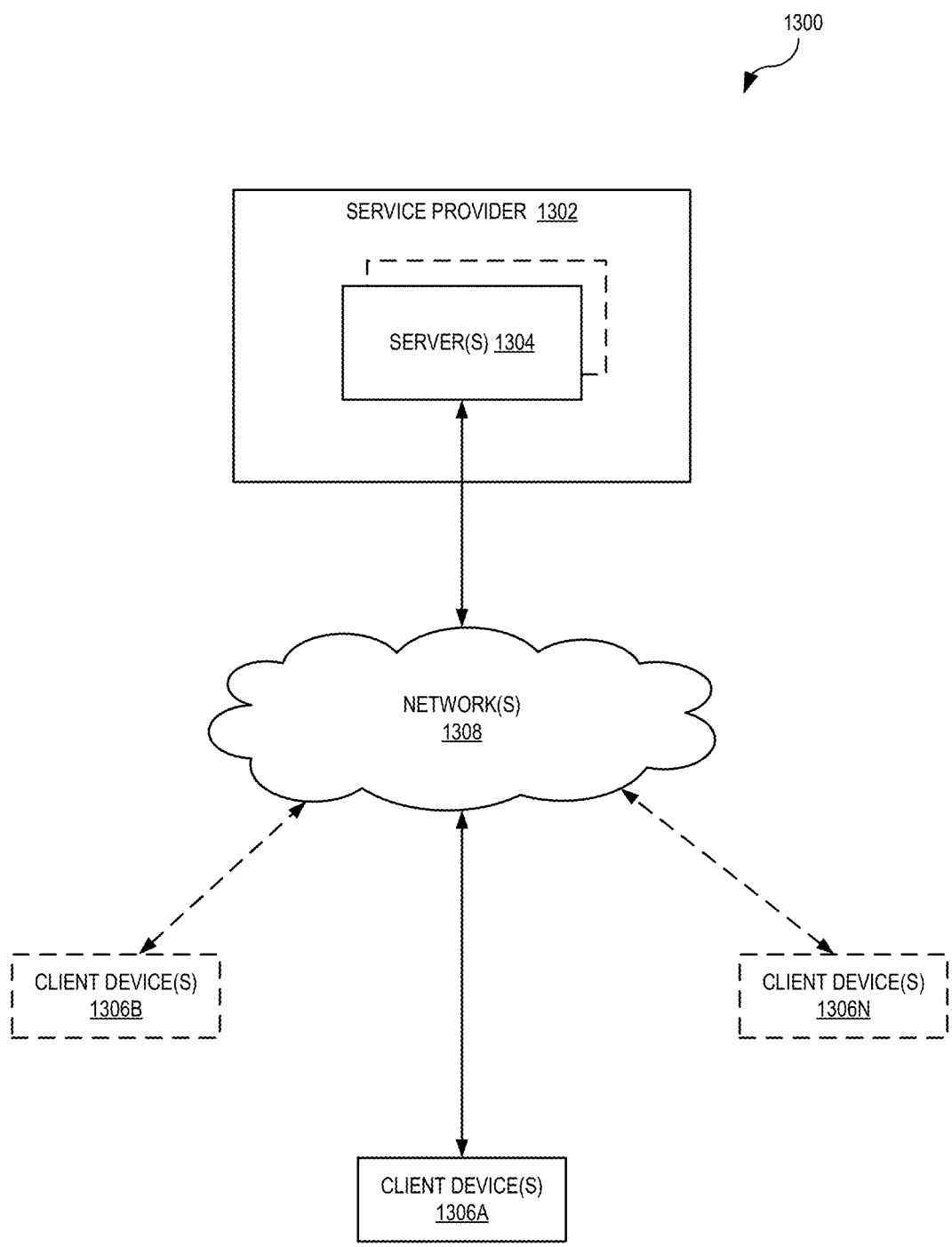
FIG. 13 illustrates a schematic diagram of an exemplary environment in which the content design system operates in accordance with one or more embodiments.

FIG. 13 illustrates a schematic diagram of an exemplary environment 1300 in which the content design system 104 operates in accordance with one or more embodiments. In one or more embodiments, the environment 1300 includes a service provider 1302 which includes one or more servers 1304 connected to a plurality of client devices 1306A-1306N via one or more networks 1308. The client devices 1306A-1306N, the one or more networks 1308, the service provider 1302, and the one or more servers 1304 communicate with each other or other components using any communication platforms and technologies suitable for transporting data and/or communication signals, including any known communication technologies, devices, media, and protocols supportive of remote data communications, examples of which are described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N directly communicate with the one or more servers 1304, bypassing the network 1308. Or alternatively, the client devices 1306A-1306N directly communicate with each other. The service provider 1302 is a public cloud service provider which owns and operates their own infrastructure in one or more data centers and provides this infrastructure to customers and end users on demand to host applications on the one or more servers 1304. The servers include one or more hardware servers (e.g., hosts), each with its own computing resources (e.g., processors, memory, disk space, networking bandwidth, etc.) which are securely divided between multiple customers, each of which host their own applications on the one or more servers 1304. In some embodiments, the service provider is a private cloud provider which maintains cloud infrastructure for a single organization. The one or more servers 1304 similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 has additional or alternative components. For example, the environment 1300 is implemented on a single computing device with the content design system 104. In particular, the content design system 104 is implemented in whole or in part on the client device 1302A.

As illustrated in FIG. 13, the environment 1300 includes client devices 1306A-1306N. The client devices 1306A-1306N comprise any computing device. For example, client devices 1306A-1306N comprise one or more personal computers, laptop computers, mobile devices, mobile phones, tablets, special purpose computers, TVs, or other computing devices, including computing devices described below with regard to FIG. 14. Although three client devices are shown in FIG. 13, it is appreciated that client devices 1306A-1306N comprise any number of client devices (greater or smaller than shown).

Moreover, as illustrated in FIG. 13, the client devices 1306A-1306N and the one or more servers 1304 communicate via one or more networks 1308. The one or more networks 1308 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 include any suitable network over which the client devices 1306A-1306N access service provider 1302 and server 1304, or vice versa. The one or more networks 1308 are discussed in more detail below with regard to FIG. 14.

In addition, the environment 1300 also includes one or more servers 1304. The one or more servers 1304 generate, store, receive, and/or transmit any type of data, including input image data 1012, output image data 1014, or other information. For example, a server 1304 receives data from a client device, such as the client device 1306A, and send the data to another client device, such as the client device 1302B and/or 1302N. The server 1304 also transmits electronic messages between one or more users of the environment 1300. In one example embodiment, the server 1304 is a data server. The server 1304 also comprises a communication server or a web-hosting server. Additional details regarding the server 1304 are discussed below with respect to FIG. 14.

As mentioned, in one or more embodiments, the one or more servers 1304 include or implement at least a portion of the content design system 104. In particular, the content design system 104 comprises an application running on the one or more servers 1304 or a portion of the content design system 104 is downloaded from the one or more servers 1304. For example, the content design system 104 includes a web hosting application that allows the client devices 1306A-1306N to interact with content hosted at the one or more servers 1304. To illustrate, in one or more embodiments of the environment 1300, one or more client devices 1306A-1306N access a webpage supported by the one or more servers 1304. In particular, the client device 1306A runs a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 provide access to one or more drawing files that include vector graphics stored at the one or more servers 1304. Moreover, the client device 1306A receives a request (i.e., via user input) to highlight one or more nodes of the vector graphic and provides the request to the one or more servers 1304. Upon receiving the request, the one or more servers 1304 automatically performs the methods and processes described above to add node highlighting to the vector graphic.

As just described, the content design system 104 is implemented in whole, or in part, by the individual elements 1302-1308 of the environment 1300. It is appreciated that although certain components of the content design system 104 are described in the previous examples with regard to particular elements of the environment 1300, various alternative implementations are possible. For instance, in one or more embodiments, the content design system 104 is implemented on any of the client devices 1306A-N. Similarly, in one or more embodiments, the content design system 104 is implemented on the one or more servers 1304. Moreover, different components and functions of the content design system 104 is implemented separately among client devices 1306A-1306N, the one or more servers 1304, and the network 1308.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above are included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that some embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is deployed using different deployment models such as private cloud, community cloud, public cloud, hybrid cloud, and so forth. In this description and in the claims, a "cloud-computing environment" is an environment in which cloud computing is employed.

Figure 14:
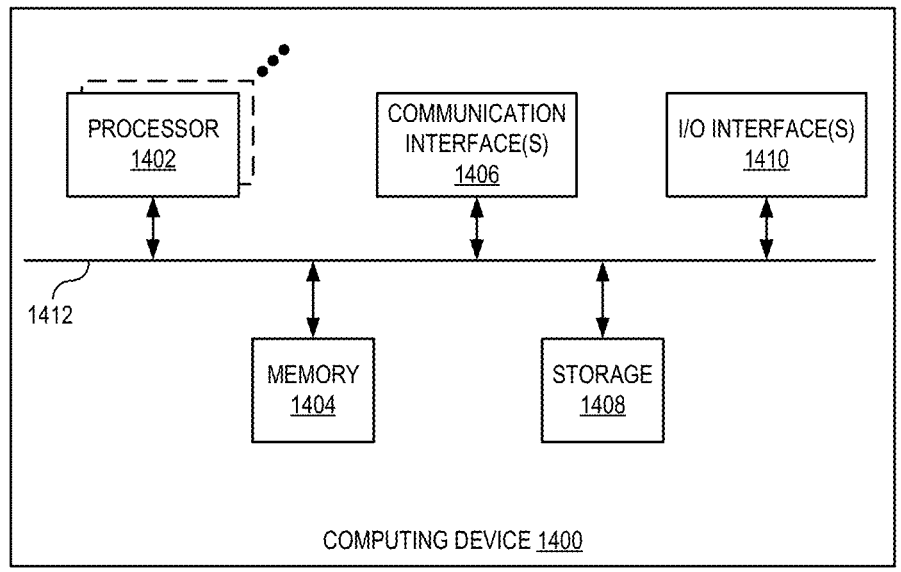
FIG. 14 illustrates a block diagram of an exemplary computing device in accordance with one or more embodiments.

FIG. 14 illustrates, in block diagram form, an exemplary computing device 1400 that is configured to perform one or more of the processes described above. One appreciates that one or more computing devices such as the computing device 1400 implement the content design system. As shown by FIG. 14, the computing device comprises a processor 1402, memory 1404, one or more communication interfaces 1406, a storage device 1408, and one or more I/O devices/interfaces 1410. In certain embodiments, the computing device 1400 includes fewer or more components than those shown in FIG. 14. Components of computing device 1400 shown in FIG. 14 are described in additional detail below.

In particular embodiments, processor(s) 1402 includes hardware for executing instructions, such as those making up a computer program. As an example, and not by way of limitation, to execute instructions, processor(s) 1402 retrieves (or fetch) the instructions from an internal register, an internal cache, memory 1404, or a storage device 1408 and decode and execute them. In various embodiments, the processor(s) 1402 includes one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 is used for storing data, metadata, and programs for execution by the processor(s). The memory 1404 includes one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 includes internal or distributed memory.

The computing device 1400 further includes one or more communication interfaces 1406. A communication interface 1406 includes hardware, software, or both. The communication interface 1406 provides one or more interfaces for communication (such as, for example, packet-based communication) between the computing device and one or more other computing devices 1400 or one or more networks. As an example, and not by way of limitation, communication interface 1406 includes a network interface controller (NIC) or network adapter for communicating with an Ethernet or other wire-based network or a wireless NIC (WNIC) or wireless adapter for communicating with a wireless network, such as a WI-FI. The computing device 1400 further includes a bus 1412. The bus 1412 comprises hardware, software, or both that couples components of computing device 1400 to each other.

The computing device 1400 includes a storage device 1408 includes storage for storing data or instructions. As an example, and not by way of limitation, storage device 1408 comprises a non-transitory storage medium described above. The storage device 1408 includes a hard disk drive (HDD), flash memory, a Universal Serial Bus (USB) drive or a combination these or other storage devices.

The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 includes a mouse, keypad or a keyboard, a touch screen, camera, optical scanner, network interface, modem, other known I/O devices or a combination of such I/O devices/interfaces 1410. The touch screen is activated with a stylus or a finger.

The I/O devices/interfaces 1410 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
    receiving, by a user input manager of a node highlighting system, a selection of a plurality of anchor points of a vector graphic to be highlighted;
    generating, by a path object manager of the node highlighting system, a graph representing one or more path objects of the vector graphic, each node of the graph corresponding to an anchor point of the one or more path objects and each connection corresponding to a path segment connecting the anchor point to another anchor point;
    identifying, by a highlight node detector of the node highlighting system, a highlight trajectory including a subset of nodes from the graph, the highlight trajectory including at least a start node and an end node;
    generating, by a highlight path generator of the node highlighting system, a highlight path including at least one or more highlight nodes corresponding to a subset of nodes from the highlight trajectory, by determining a location of a first highlight node corresponding to a first node using an angle associated with the first node from the highlight trajectory and a spread parameter, wherein the highlight path includes a plurality of nodes from the highlight trajectory and at least the first highlight node to form a closed highlight path object; and
    updating, by the highlight path generator of the node highlighting system, the vector graphic to include the highlight path.

2. The computer-implemented method of claim 1, wherein identifying, by the highlight node detector of the node highlighting system, the highlight trajectory including the subset of nodes from the graph, the highlight trajectory including at least the start node and the end node further comprises:
    identifying at least the start node and the end node from the graph, the start node and the end node labeled by a user when corresponding anchor points were selected by the user.

3. The computer-implemented method of claim 2, wherein identifying, by the highlight node detector of the node highlighting system, the highlight trajectory including the subset of nodes from the graph, the highlight trajectory including at least the start node and the end node further comprises:
    identifying at least one intermediate node based on a cursor trajectory during selection of the plurality of anchor points, the at least one intermediate node corresponding to an anchor point not selected by the user.

4. The computer-implemented method of claim 1, wherein generating, by the highlight path generator of the node highlighting system, the highlight path including the at least one or more highlight nodes corresponding to the subset of nodes from the highlight trajectory, further comprises:
    determining the angle associated with the first node from the highlight trajectory based on a previous segment and a next segment; and
    determining an angular bisector of the angle associated with the first node.

5. The computer-implemented method of claim 4, wherein the previous segment and the next segment are straight line segments and wherein the angle associated with the first node is determined based on an angle associated with the previous segment and an angle associated with the next segment.

6. The computer-implemented method of claim 4, wherein the previous segment and the next segment are curved segments and wherein the angle associated with the first node is determined based on an angle associated with a line connecting an in control point to the first node and an angle associated with a line connecting an out control point to the first node.

7. The computer-implemented method of claim 1, wherein generating, by the highlight path generator of the node highlighting system, the highlight path including the at least one or more highlight nodes corresponding to the subset of nodes from the highlight trajectory, further comprises:
    for each node from the highlight trajectory:
        determining an angle associated with a node from the highlight trajectory based on a previous segment and a next segment;
        determining an angular bisector of the angle associated with the node;
        adding the highlight node to the highlight path; and
    for each highlight node from the highlight path, determining a location of an offset highlight node corresponding to the node along the angular bisector based on the spread parameter and an offset parameter, wherein the highlight path includes a plurality of highlight nodes and a plurality of offset highlight nodes to form the closed highlight path object.

8. The computer-implemented method of claim 1, wherein generating, by the path object manager of the node highlighting system, the graph representing the one or more path objects of the vector graphic, each node of the graph corresponding to the anchor point of the one or more path objects and each connection corresponding to the path segment connecting the anchor point to another anchor point, further comprises:
  generating an anchor point list comprising a plurality of anchor points associated with the one or more path object;
  generating a segment list comprising a plurality of segments connecting the plurality of anchor points;
  identifying at least one overlapping anchor point pair;
  updating the anchor point list to remove one anchor point from the at least one overlapping anchor point pair to create an updated anchor point list; and
  updating the segment list based on the updated anchor point list to create an updated segment list.

9. The computer-implemented method of claim 8, wherein generating, by the path object manager of the node highlighting system, the graph representing the one or more path objects of the vector graphic, each node of the graph corresponding to the anchor point of the one or more path objects and each connection corresponding to the path segment connecting the anchor point to another anchor point, further comprises:
  identifying at least one anchor point overlapping at least one segment;
  splitting the at least one segment into two segments at the at least one anchor point;
  updating the segment list based on the split at least one segment to create the updated segment list; and
  generating the graph based on the updated anchor point list and the updated segment list.

10. A system comprising:
  means for receiving a selection of a plurality of anchor points of a vector graphic to be highlighted;
  means for generating a graph representing one or more path objects of the vector graphic, each node of the graph corresponding to an anchor point of the one or more path objects and each connection corresponding to a path segment connecting the anchor point to another anchor point;
  means for identifying a highlight trajectory including a subset of nodes from the graph, the highlight trajectory including at least a start node and an end node;
  means for generating a highlight path including at least one or more highlight nodes corresponding to a subset of nodes from the highlight trajectory, by determining a location of a first highlight node corresponding to a first node using an angle associated with the first node from the highlight trajectory and a spread parameter, wherein the highlight path includes a plurality of nodes from the highlight trajectory and at least the first highlight node to form a closed highlight path object; and
  means for updating the vector graphic to include the highlight path.

11. The system of claim 10 wherein the means for identifying the highlight trajectory including the subset of nodes from the graph, the highlight trajectory including at least the start node and the end node further comprises:
  means for identifying at least the start node and the end node from the graph, the start node and the end node labeled by a user when corresponding anchor points were selected by the user.

12. The system of claim 11, wherein the means for identifying the highlight trajectory including the subset of nodes from the graph, the highlight trajectory including at least the start node and the end node further comprises:
  means for identifying at least one intermediate node based on a cursor trajectory during selection of the plurality of anchor points, the at least one intermediate node corresponding to an anchor point not selected by the user.

13. The system of claim 10, wherein the means for generating the highlight path including the at least one or more highlight nodes corresponding to the subset of nodes from the highlight trajectory, further comprises:
  means for determining the angle associated with a first node from the highlight trajectory based on a previous segment and a next segment; and
  means for determining an angular bisector of the angle associated with the first node.

14. The system of claim 13, wherein the previous segment and the next segment are straight line segments and wherein the angle associated with the first node is determined based on an angle associated with the previous segment and an angle associated with the next segment.

15. The system of claim 13, wherein the previous segment and the next segment are curved segments and wherein the angle associated with the first node is determined based on an angle associated with a line connecting an in control point to the first node and an angle associated with a line connecting an out control point to the first node.

16. A system comprising:
  a computing device implementing a node highlighting system, the node highlighting system comprising:
    a user input manager of a node highlighting system to receive a selection of a plurality of anchor points of a vector graphic to be highlighted;
    a path object manager of the node highlighting system to generate a graph representing one or more path objects of the vector graphic, each node of the graph corresponding to an anchor point of the one or more path objects and each connection corresponding to a path segment connecting the anchor point to another anchor point;
    a highlight node detector of the node highlighting system to identify a highlight trajectory including a subset of nodes from the graph, the highlight trajectory including at least a start node and an end node; and
    a highlight path generator of the node highlighting system to:
      generate a highlight path including at least one or more highlight nodes corresponding to a subset of nodes from the highlight trajectory, by determining a location of a first highlight node corresponding to a first node using an angle associated with the first node from the highlight trajectory and a spread parameter, wherein the highlight path includes a plurality of nodes from the highlight trajectory and at least the first highlight node to form a closed highlight path object; and
      update the vector graphic to include the highlight path.

17. The system of claim 16, wherein to identify the highlight trajectory including the subset of nodes from the graph, the highlight trajectory including at least the start node and the end node, the highlight node detector is further configured to:
  identify at least the start node and the end node from the graph, the start node and the end node labeled by a user when corresponding anchor points were selected by the user.

18. The system of claim 17, wherein to identify the highlight trajectory including the subset of nodes from the graph, the highlight trajectory including at least the start node and the end node, the highlight node detector is further configured to:
  identify at least one intermediate node based on a cursor trajectory during selection of the plurality of anchor points, the at least one intermediate node corresponding to an anchor point not selected by the user.

19. The system of claim 16, wherein to generate the highlight path including at least the one or more highlight nodes corresponding to the subset of nodes from the highlight trajectory, the highlight path generator is further configured to:
  determine the angle associated with the first node from the highlight trajectory based on a previous segment and a next segment; and
  determine an angular bisector of the angle associated with the first node.

20. The system of claim 16, wherein to generate the highlight path including the at least one or more highlight nodes corresponding to the subset of nodes from the highlight trajectory, the highlight path generator is further configured to:
  for each node from the highlight trajectory:
    determine an angle associated with a node from the highlight trajectory based on a previous segment and a next segment;
    determine an angular bisector of the angle associated with the node;
    add the highlight node to the highlight path; and
  for each highlight node from the highlight path, determine a location of an offset highlight node corresponding to the node along the angular bisector based on the spread parameter and an offset parameter, wherein the highlight path includes a plurality of highlight nodes and a plurality of offset highlight nodes to form the closed highlight path object.

* * * * *